(12) United States Patent
Son et al.

(10) Patent No.: US 11,511,445 B2
(45) Date of Patent: Nov. 29, 2022

(54) GRIPPER

(71) Applicant: LG ELECTRONICS INC., Seoul (KR)

(72) Inventors: Changwoo Son, Seoul (KR); Changkyu Kim, Seoul (KR); Sunggil Park, Seoul (KR); Seyul Son, Seoul (KR); Taeyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 350 days.

(21) Appl. No.: 16/803,759

(22) Filed: Feb. 27, 2020

(65) Prior Publication Data
US 2021/0129355 A1 May 6, 2021

(30) Foreign Application Priority Data

Nov. 1, 2019 (KR) .......................... 10-2019-0138730

(51) Int. Cl.
*B25J 15/12* (2006.01)
*B25J 15/00* (2006.01)

(52) U.S. Cl.
CPC ........... *B25J 15/12* (2013.01); *B25J 15/0028* (2013.01); *B25J 15/0033* (2013.01)

(58) Field of Classification Search
CPC .... B25J 15/12; B25J 15/0028; B25J 15/0033; B25J 15/0253; B25J 15/0004; B25J 15/0266; B25J 9/0015
See application file for complete search history.

(56) References Cited

U.S. PATENT DOCUMENTS

| 4,600,357 | A  | * | 7/1986 | Coules | ................... B25J 13/082 |
|           |    |   |        |        | 414/730 |
| 9,533,419 | B1 | * | 1/2017 | Strauss | ................ B25J 15/0033 |
| 10,005,191 | B2 | * | 6/2018 | Takikawa | ............. B25J 15/0004 |
| 11,148,300 | B2 | * | 10/2021 | Sakakibara | .......... B25J 15/0475 |
| 2013/0057004 | A1 | * | 3/2013 | Murata | ................ B25J 15/0009 |
|           |    |   |        |        | 294/213 |

FOREIGN PATENT DOCUMENTS

JP 2018176407 A * 11/2018 ............. B23Q 7/043

* cited by examiner

*Primary Examiner* — Stephen A Vu
(74) *Attorney, Agent, or Firm* — Birch, Stewart, Kolasch & Birch, LLP

(57) ABSTRACT

Disclosed is a gripper including a pair of main bodies each having an internal space and spaced apart from each other, a pair of openings provided at ends of the pair of main bodies, a pair of moving bodies protruding from the ends of the pair of main bodies through the openings, a pair of inner bodies fixed in the internal space of the pair of main bodies, and a pair of springs configured to be compressed between the inner body and the moving body.

9 Claims, 9 Drawing Sheets

GRIPPER

CROSS-REFERENCE TO RELATED APPLICATIONS

This application claims the benefit of the Korean Patent Application No. 10-2019-0138730 filed on Nov. 1, 2019, which is hereby incorporated by reference as if fully set forth herein.

BACKGROUND

Field of the Disclosure

The present disclosure relates to a gripper gripping an object.

Discussion of the Related Art

In general, a machine that performs a motion similar to humans' motion using an electrical or magnetic action is called a robot. Recently, robots have been used in various fields due to the development of control technologies, and examples of robots include surgical robots, housekeeping robots, service robots, aerospace remote robots, dangerous object handling robots, and the like. These robots work by using manipulators that may be moved close to a movement of arms or hands by electrical and mechanical mechanisms.

The manipulator may be provided with a gripper, the gripper may grip an object.

SUMMARY

An aspect of the present disclosure is directed to providing a gripper that may easily grip objects of various forms.

To achieve these and other advantages and in accordance with the purpose of the disclosure, as embodied and broadly described herein, there is provided a gripper including: a pair of moving bodies respectively protruding from ends of a pair of main body; an inner body fixed inside the main body; and a spring compressed between the inner body and the moving body.

More specifically, the gripper may include: a pair of main bodies each having an internal space and spaced apart from each other; a pair of openings provided at ends of the pair of main bodies; a pair of moving bodies protruding from the ends of the pair of main bodies through the openings; a pair of inner bodies fixed in the internal space of the pair of main bodies; and a pair of springs configured to be compressed between the inner body and the moving body.

In addition, the gripper may further include a connecting bar fastened to the moving body, configured to move together with the moving body, and having the spring on an outer circumference thereof. The inner body may have a hollow container shape into which the connecting bar is inserted.

In addition, the gripper may further include: a pair of sub-openings provided at the pair of main bodies connected to the openings, and facing each other; and a pair of grip pads fastened to the moving bodies through the sub-openings and facing each other.

In addition, the grip pad may protrude with respect to a virtual surface passing through both ends of the pair of moving bodies.

In addition, the gripper may further include a pair of rollers located outside the main body and connected to the pair of moving bodies.

In addition, the grip pad may be adjacent to a virtual surface tangent to the pair of rollers.

In another aspect of the present disclosure, there is provided a gripper including: a pair of flexible bodies spaced apart from each other, and a pair of grip portions covering ends of the pair of flexible bodies.

More specifically, the gripper may include: a pair of bases spaced apart from each other; a pair of flexible bodies mounted at the pair of bases; and a pair of main bodies fastened to the pair of bases and configured to support the pair of flexible bodies. The main body may include: a fastening portion fastened to the base; a grip portion configured to cover an end of the flexible body; and a connecting portion connecting the fastening portion and the grip portion.

In addition, the gripper may be configured to grip an object is gripped between the pair of flexible bodies or between a pair of grip portions In addition, the flexible body may include: a first pad in contact with an object; a second pad located outside with respect to the first pad; and a plurality of third pads connecting the first pad and the second pad and spaced apart from each other.

In addition, an opening in which the flexible body is disposed may be provided at the main body, and the opening may be located between the fastening portion and the grip portion and located on an inner side than the connecting portion.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
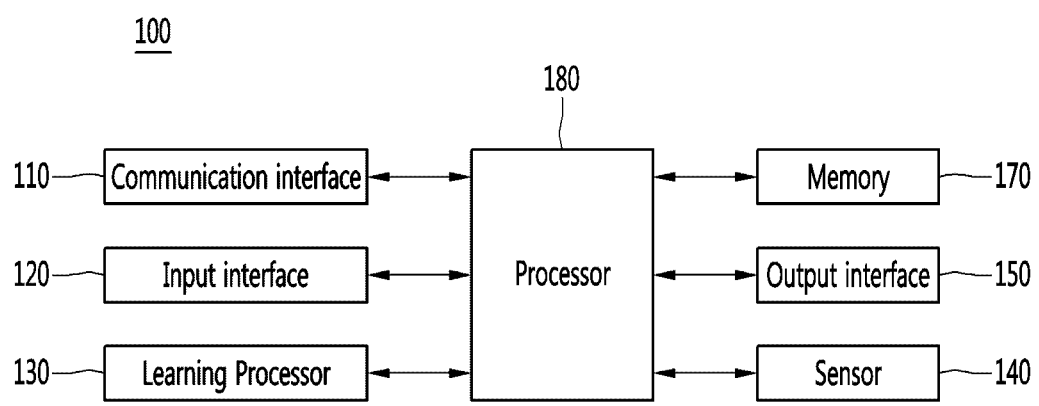
FIG. 1 illustrates an AI device including a robot according to an embodiment of the present disclosure.

Hereinafter, specific embodiments of the present disclosure will be described in detail.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network may be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state where a label for learning data is given, and the label may mean the correct answer (or result value) that the artificial neural network must infer when the learning data is input to the artificial neural network. The unsupervised learning may refer to a method of learning an artificial neural network in a state where a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensor 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 may acquire at least one of internal information about the AI device 100, ambient environment information about the AI device 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display unit for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
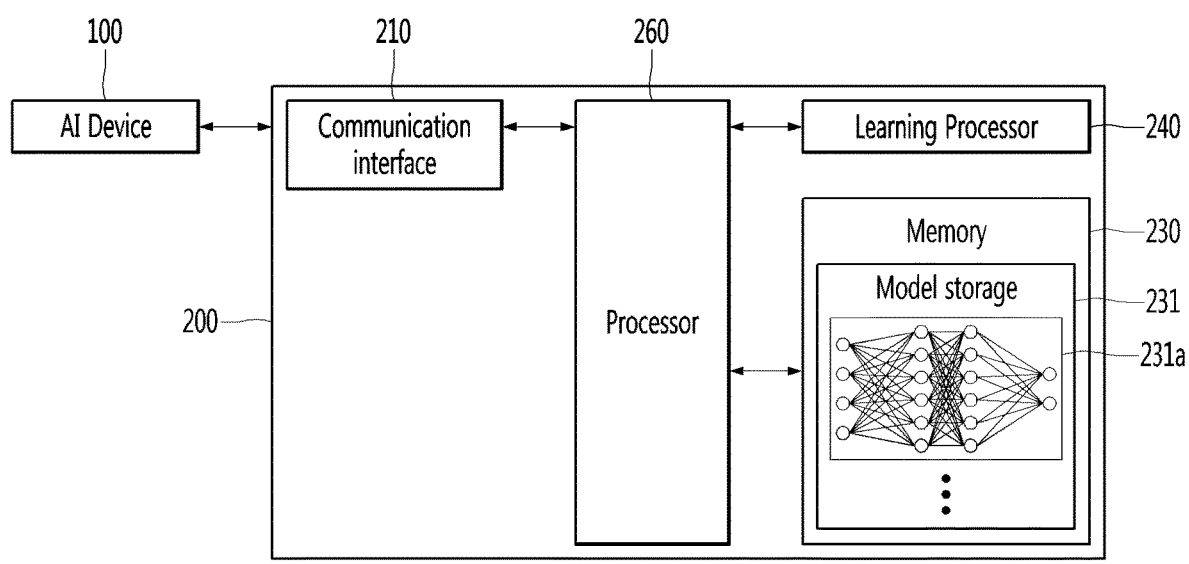
FIG. 2 illustrates an AI server connected to a robot according to an embodiment of the present disclosure.

FIG. 2 illustrates an AI server 200 connected to a robot according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 may transmit and receive data to and from an external device such as the AI device 100.

The memory 230 may include a model storage 231. The model storage 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
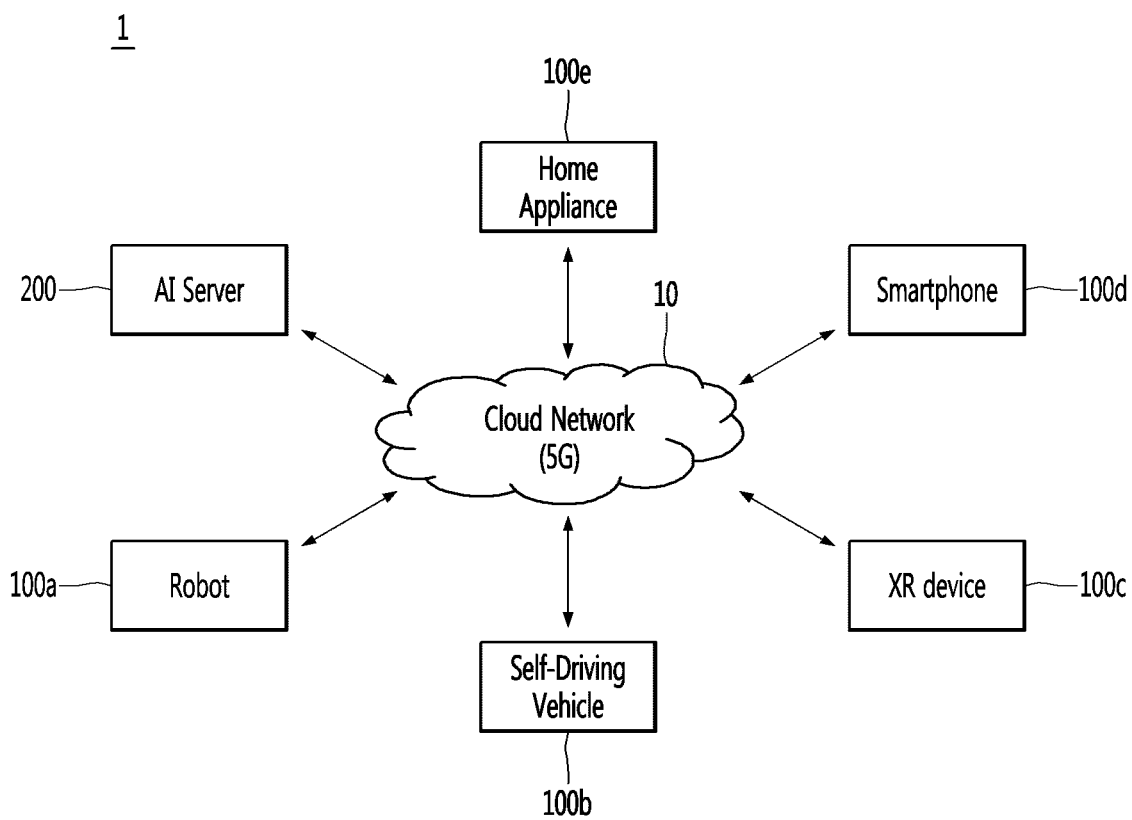
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs A processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of A processing of the connected AI devices 100a to 100e.

At this time, the AI server 200 may learn the artificial neural network according to the machine learning algorithm instead of the A devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
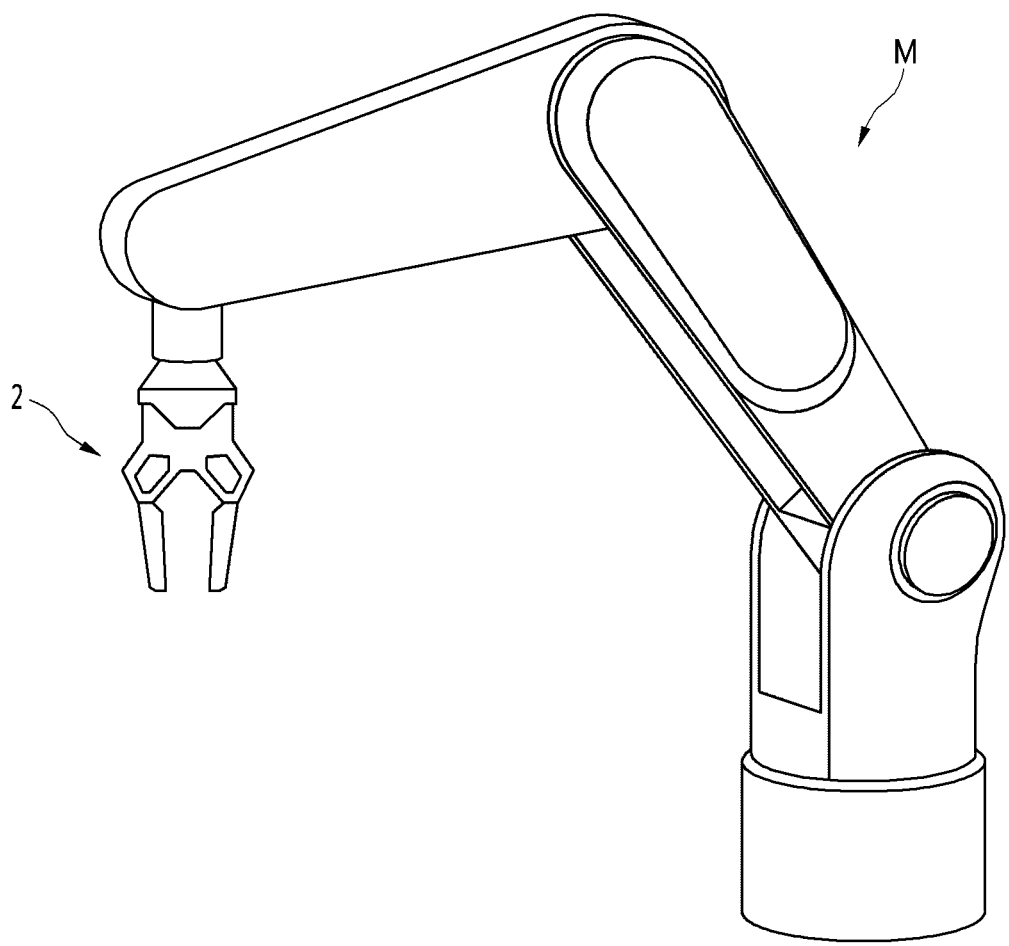
FIG. 4 is a schematic view in which a gripper is provided at a manipulator according to an embodiment of the present disclosure.
Figure 5:
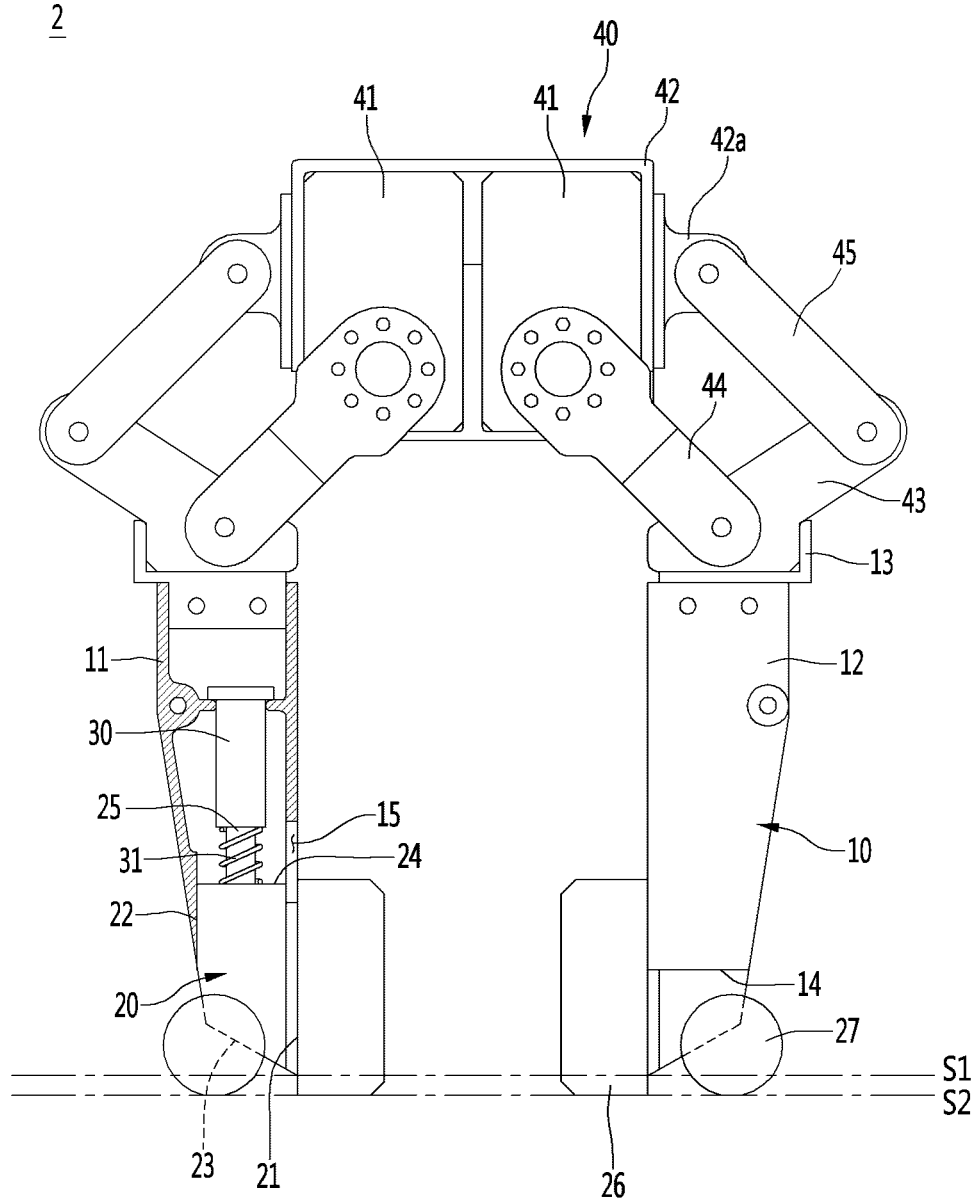
FIG. 5 illustrates a gripper according to an embodiment of the present disclosure.

FIG. 4 is a schematic view of a gripper provided in a manipulator according to an embodiment of the present disclosure, and FIG. 5 illustrates a gripper according to an embodiment of the present disclosure.

A gripper 2 according to the present embodiment may grip an object (not shown) and may be provided in the manipulator M.

The manipulator M may be included in the robot 100a described above. The manipulator M may include a plurality of arms rotatably connected to each other and a plurality of actuators rotating the plurality of arms. The gripper 2 may be provided at an end arm of the manipulator M.

The gripper 2 according to the present embodiment may include a main body 10, a moving body 20, an inner body 30, and a spring 31.

The main body 10 may be elongated in one direction. The main body 10 may have an internal space. The main body 10 may be provided as a pair spaced apart from each other. The pair of main bodies 10 may be symmetrical in shape. A distance between the pair of main bodies 10 may be varied by a grip mechanism 40 described below.

The main body 10 may include a body 11 having one open surface and a cover 12 covering the one open surface of the body 11. Therefore, an operator may easily maintain the inside of the main body 10 by separating the cover 12 from the body 11. For convenience of description, FIG. 5 illustrates a state where the cover 12 of a left main body 10, among the pair of main bodies 10, is removed.

A manipulator M side end, among both ends of the main body 10, may be referred to as an inner end, and the opposite end of the manipulator M side end may be referred to as an outer end.

The main body 10 may further include a base 13. The base 13 may be located at an inner end of the main body 10. The base 13 may be fastened to the body 11 and the cover 12.

An opening 14 may be formed at the end of the main body 10. More specifically, the opening 14 may be formed at an outer end of the main body 10.

The moving body 20 may protrude from the end of the main body 10 through the opening 14. The moving body 20 may be provided to be movable in a lengthwise direction of the main body 10. More specifically, the moving body 20 protruding from the end of the main body 20 may move toward the inside of the main body 10 by an external force, and when the external force is removed, the moving body 20 may be returned to its original position by an elastic force of the spring 31 (to be described).

At least some of inner circumferences of the opening 14 may be in contact with the moving body 20 to guide movement of the moving body 20.

The moving body 20 may include a first surface 21, a second surface located on the opposite side of the first surface 21, and third surface 23 and a fourth surface 24 connecting the first surface 21 and the second surface 22.

The first surface 21 may be an inner surface of the moving body 20. The first surface 21 may face between the pair of main bodies 10.

The second surface 22 may be an outer surface of the moving body 20.

The third surface 23 may connect an outer end of the first surface 21 and an outer end of the second surface 22. At least a portion of the third surface 23 may be located outside the main body 10. The third surface 23 may be inclined closer to the main body 10 toward the second surface 22 from the first surface 21.

The fourth surface 24 may be located inside the main body 10. The fourth surface 24 may connect an inner end of the first surface 21 and an inner end of the second surface 22.

A connecting body 25 may be fastened to the moving body 20. The connecting bar 25 may be connected to the fourth surface 24 of the moving body 20. The connecting bar 25 may move together with the moving body 20. The connecting bar 25 may be located inside the main body 10.

The connecting bar 25 may be elongated in the lengthwise direction of the main body 10. The connecting bar 25 may connect the moving body 20 and the inner body 30.

The inner body 30 may be fixed to the inside of the body 10. The inner body 30 may have a hollow cylindrical shape into which the connecting bar 25 is inserted. The inner body 30 may be elongated in the lengthwise direction of the main body 10.

The connecting bar 25 may move together with the moving body 20, in a state being inserted in the inner body 30. Therefore, the inner body 30 may guide movement of the connecting bar 25 and the moving body 20 fastened thereto.

The spring 31 may be a coil spring. The spring 31 may be compressed between the inner body 30 and the moving body 20. One end of the spring 31 may be connected to the inner body 30, and the other end may be connected to the moving body 20. The spring 31 may be located inside the main body 10.

The spring 31 may be provided on an outer circumference of the connecting bar 25. More specifically, the spring 31 may surround the outer circumference of the connecting bar 25.

The gripper 2 according to the present embodiment may further include a grip pad 26 fastened to the moving body 20. The grip pad 26 may be fastened to the first surface 21 of the moving body 20.

The grip pad 26 may be provided as a pair facing each other. The pair of grip pads 26 may come into contact with an object and grip the object. The grip pad 26 may include a material having a high coefficient of friction which is elastically deformed, such as rubber or urethane. Therefore, the grip pad 26 may grip the object firmly.

The grip pad 26 may be fastened to the moving body 20 through a sub-opening 15 formed on the main body 10. The grip pad 26 may protrude to the outside of the main body 10 or may be located outside the main body 10.

The sub-opening 15 may be connected to the opening 14. The sub-opening 15 may be formed on an inner surface of the main body 10. The inner surface of the main body 10 may be a surface in which the pair of main bodies 10 face each other. The inner surface of the main body 10 may face the object gripped by the gripper 2.

The grip pad 26 may protrude with respect to a virtual surface S1 tangent to the ends of the pair of moving bodies 20. Alternatively, an end of the grip pad 26 may be located on the virtual surface S1. Therefore, the grip pad 26 may preferentially come into contact with a bottom surface of the moving body 20 and the grip pad 26 may easily grip a thin object.

The gripper 2 according to the present embodiment may further include a roller 27 connected to the moving body 20.

The roller 27 may be located outside of the main body 10. A rotary shaft of the roller 27 may be adjacent to the second surface 22 or the third surface 23 than the first surface 21 of the moving body 20. That is, a distance between the rotary shaft of the roller 27 and the second surface 22 or the third surface 23 may be shorter than a distance between the rotary shaft of the roller 27 and the first surface 21.

The roller 27 may be located on an outer side with respect to the grip pad 26. More specifically, the pair of grip pads 26 may be located between the pair of rollers 27.

The roller 27 may be in contact with the bottom surface when the gripper 2 picks up an object placed on the bottom surface and may reduce a frictional force between the gripper 2 and the bottom surface.

The grip pad 26 may be adjacent to a virtual surface S2 tangent to the pair of rollers 27. An end of the grip pad 26 may be located on the virtual surface S2. Therefore, when the roller 27 is in contact with the bottom surface, the grip pad 26 may easily grip a thin object.

Meanwhile, the gripper 2 may further include a grip mechanism 40 for varying a distance between the pair of main bodies 10.

The grip mechanism 40 may include a motor 41 and linkages 43, 44, and 45 for transmitting power of the motor 41 to the main body 10.

The motor 41 may be provided with a pair for operating the pair of main bodies 10, respectively. The pair of motors 41 may be arranged symmetrically.

The motor 41 may be mounted on a motor bracket 42, and the motor bracket 42 may be mounted on the manipulator M.

The linkages 43, 44, and 45 may be connected to the body 10. The linkages 43, 44, and 45 may be provided as a pair connecting the pair of motors 41 and the pair of main bodies 10, respectively. The pair of linkages 43, 44, and 45 may be arranged symmetrically.

The linkage 43, 44, and 45 may include a fastening link 43 fastened to the main body 10, a first link 44 for connecting the fastening link 43 and the motor 41, and a second link 45 connecting the fastening link 43 and the motor bracket 42.

The fastening link 43 may be fastened to the base 13 of the main body 10. The fastening link 43 may be elongated in a direction toward the outside as the main body 10 as the fastening link 43 becomes away from the main body 10. Even if the motor 41 rotates, a lengthwise direction of the fastening link 43 with respect to the main body 10 may be maintained.

The base 13 side end, among both ends of the fastening link 43, may be referred to as an inner end, and the opposite end of the base 13 side end may be referred to as an outer end.

The first link 44 may connect the motor 41 and the fastening link 43. More specifically, one end of the first link 44 may be connected to the rotary shaft of the motor 41, and the other end of the first link 44 may be rotatably connected to the inner end of the fastening link 43.

The second link 45 may connect the motor bracket 42 and the fastening link 43. More specifically, one end of the second link 45 may be rotatably connected to the link connecting portion 42a formed in the motor bracket 42. The link connecting portion 42a may protrude from the outer surface of the motor bracket 42. The other end of the second link 45 may be rotatably connected to the outer end of the fastening link 43.

The second link 45 may be parallel to the first link 44. Even if the motor 41 rotates, the second link 45 may be maintained in parallel with the first link 44.

Due to the above configuration of the linkages 43, 44, and 45, when the motor 41 rotates, the pair of main bodies 10 are kept in parallel with each other and the distance therebetween may be varied.

The pair of motors 41 may rotate in the mutually opposite directions to actuate the gripper 2. For example, when the left motor 41 rotates in a counterclockwise direction and the right motor 41 rotates in a clockwise direction, the pair of main bodies 10 is close to each other and the object may be gripped between the pair of grip pads 26. The object may be gripped. In contrast, when the left motor 41 rotates in the clockwise direction and the right motor 41 rotates in the counterclockwise direction, the distance between the pair of main bodies 10 increases and the object gripped between the pair of grip pads 26 may be released.

Hereinafter, an operation of the gripper 2 according to the present embodiment will be described.

The manipulator M may move the gripper 2 such that the pair of rollers 27 of the gripper 2 comes into contact with the bottom surface on which the object is placed. Here, the grip pad 26 may be in contact with or adjacent to the bottom surface. In addition, the object may be located between the pair of grip pads 26.

When the roller 27 presses the bottom surface, the roller 27, the grip pad 26, and the moving body 20 may be lifted by a reaction force of the bottom surface. When the moving body 20 is lifted, the spring 31 may be compressed between the inner body 30 and the moving body 20.

Thus, the roller 27 and the grip pad 26 may reliably contact the bottom surface even if the manipulator M is not precisely controlled. In addition, the spring 31 may alleviate an impact that occurs when the roller 27 hits the bottom surface.

In addition, since the spring 31 is connected to the moving body 20 protruding from the end of the main body 10 to alleviate the impact, shaking of the main body 10 may be minimized due to the spring 31.

With the pair of grip pads 26 located on both sides of the object, the grip mechanism 40 may be controlled to bring the pair of bodies 10 closer to each other. Thus, the object may be gripped between a pair of grip pads 26.

Since the grip pads 26 are close to each other in contact with or adjacent to the bottom surface, the gripper 2 may smoothly grip even an object which is thin or which is formed of a soft material. In addition, since the roller 27 rotates in contact with the bottom surface, friction between the gripper 2 and the bottom surface may be minimized.

Figure 6:
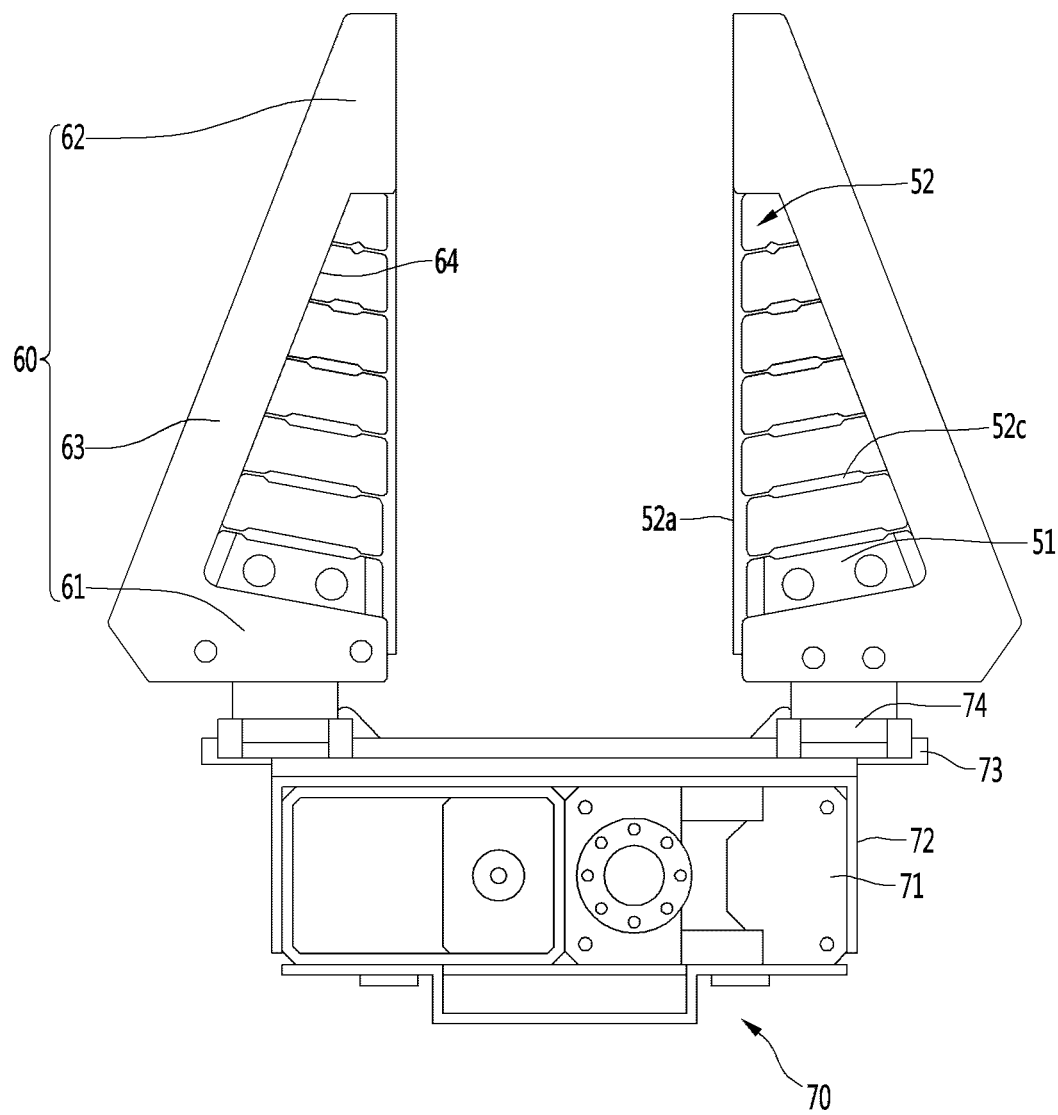
FIG. 6 illustrates a gripper according to another embodiment of the present disclosure.
Figure 7:
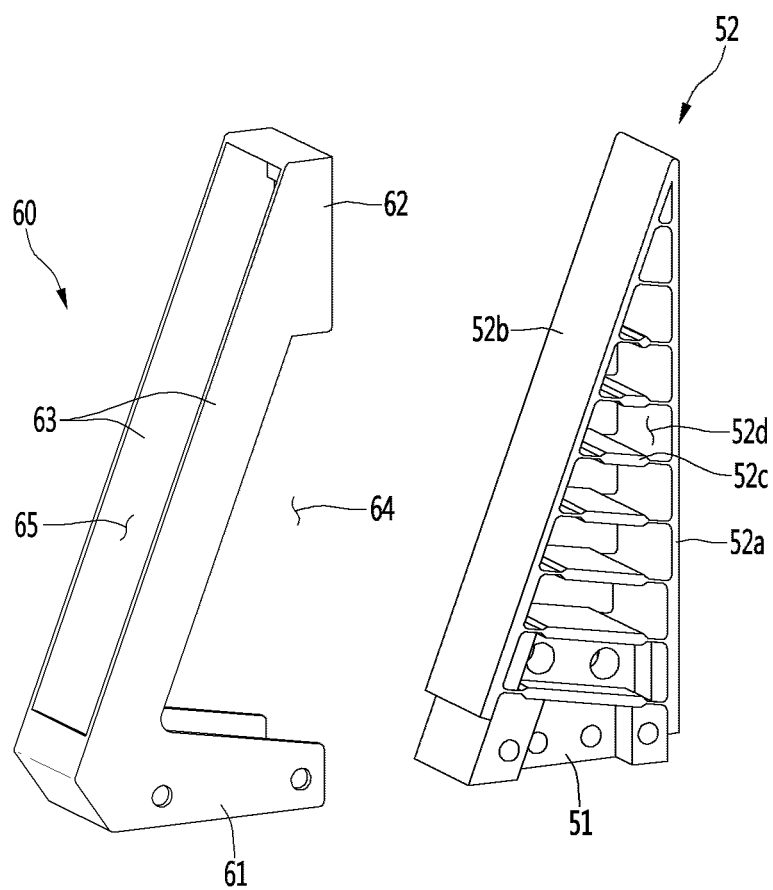
FIG. 7 illustrates a state where a main body and a flexible body shown in FIG. 6 are separated.

FIG. 6 illustrates a gripper according to another embodiment of the present disclosure, and FIG. 7 illustrates a state where the main body and the flexible body shown in FIG. 6 are separated.

The gripper 2' according to the present embodiment may grip an object (not shown) and may be provided at the manipulator M (see FIG. 4).

The gripper 2' according to the present embodiment may include a base 51, a flexible body 52, and a main body 60.

The base 51 may be provided as a pair spaced apart from each other. The pair of bases 51 may be symmetrical with each other. A distance between the pair of bases 51 may be varied by the grip mechanism 70 described below.

The flexible body 52 may include a soft material such as rubber or urethane. The flexible body 52 may be elastically deformed by an external force.

The flexible body 52 may be mounted on the base 51. The flexible body 52 may be supported by the main body 60.

More specifically, the flexible body 52 may be elongated approximately in one direction, and one end of the flexible body 52 may be fastened to the base 51.

The base 51 side end, among both ends of the flexible body 52, may be an inner end, and the opposite end of the base 51 side end may be an outer end.

The flexible body 52 may be provided as a pair of fastened to the pair of bases 51, respectively, and spaced apart from each other. The pair of flexible bodies 52 may be symmetrical with each other.

An object may be gripped between the pair of flexible bodies 52. When the object is gripped between the pair of flexible bodies 52, the flexible body 52 may be elastically deformed to correspond to a shape of the object. Therefore, the object may be gripped stably. In addition, the flexible body 52 may alleviate an impact applied to the object, the object that is easy to break may be safely gripped.

The flexible body 52 may include a first pad 52a, a second pad 52b located opposite to the first pad 52a, and a plurality of third pad 52c located between the first pad 52a and the second pad 52b. The flexible body 52 may be integrally formed.

The first pad 52a may form an inner surface of the flexible body 52. Each of the first pads 52a of the pair of flexible bodies 52 may be parallel to each other and face each other. The object may be gripped between the pair of first pads 52a.

The second pad 52b may form an outer surface of the flexible body 52. The second pad 52b may be located on an outer side with respect to the first pad 52a.

The second pad 52b may be inclined in a direction closer to the first pad 52a as it becomes away from the base 51. However, the present disclosure is not limited thereto, and the second pad 52b and the first pad 52a may be formed to be parallel.

The third pads 52c may be located between the first pad 52a and the second pad 52b. The plurality of third pads 52c may be spaced apart from each other. The plurality of third pads 52c may be parallel to each other but are not limited thereto.

The third pad 52c may connect the first pad 52a and the second pad 52b. More specifically, one end of the third pad 52c may be connected to the first pad 52a and the other end thereof may be formed on the second pad 52b.

A plurality of cavities 52d may be formed at the flexible body 52. The cavities 52d may be defined by the first pad 52a, the second pad 52b, and a pair of third pads 52c adjacent to each other. That is, the cavities 52d may be located between the pair of third pads 52c adjacent to each other.

Based on the above configuration of the flexible body 52, the flexible body 52 may be smoothly deformed even with a relatively small external force.

The main body 60 may be fastened to the base 51 and support the flexible body 52. The main body 60 may cover the flexible body 52 from the outside. The main body 60 may include a hard material harder than the flexible body 52. For example, the main body 60 may include a metal material.

The main body 60 may be provided as a pair fastened respectively to a pair of bases 51 and covering a pair of flexible bodies 52, respectively. The pair of main bodies 60 may be symmetrical with each other.

More specifically, the main body 60 may include a fastening portion 61, a grip portion 62, and a connecting portion 63. The fastening portion 61, the grip portion 62, and the connecting portion 63 may be integrally formed.

The fastening portion 61 may be fastened with the base 51. The fastening portion 61 may include a pair of fastening panels fastened to both surfaces of the base 51, respectively.

The grip portion 62 may cover an end of flexible body 52. More specifically, the grip portion 62 may cover an outer end of the first pad 52a.

The grip portions 62 of the pair of main bodies 60 may face each other. An object may be gripped between the pair of grip portions 62. Since the grip portion 62 is formed of a hard material unlike the flexible body 52, the grip portion 62 may strongly grip the object. In addition, since the grip portion 62 is not deformed even when it grips the object, the grip portion 62 may grip the object precisely.

The connecting portion 63 may connect the fastening portion 61 and the grip portion 62.

More specifically, the connecting portion 63 may include a pair of connecting panels respectively connecting the pair of fastening panels of the fastening portion 61 to both edges of the grip portion 62. The pair of connecting panels may cover both edges of the second panel 52b of the flexible body 52, respectively.

The main body 60 may be formed with an opening 64 in which the flexible body 52 is disposed. The opening 64 may be located between the fastening portion 61 and the grip portion 62 and may be located on an inner side with respect to the connecting portion 63.

The pair of flexible bodies 52 may face each other through the opening 64. In addition, the opening 64 may communicate with the cavity 52d formed at the flexible body 52. Due to the opening 64, the object gripped between the pair of flexible bodies 52 may not interfere with the connecting portion 63.

The main body 60 may have an opening 65 through which the flexible body 52 passes when the flexible body 52 is deformed. The opening 65 may be formed at the connecting portion 63. More specifically, the opening 65 may be located between the pair of connecting panels included in the connecting portion 63.

The flexible body 52 may be deformed outward by a reaction force of the object gripped between the pair of flexible bodies 52, and a portion of the deformed flexible body 52 may pass through the opening 65. Thus, the flexible body 52 may be more easily deformed as compared with a case where the opening 65 is not provided.

Meanwhile, the gripper 2' may further include a grip mechanism 70 that varies a distance between the pair of bases 51.

The grip mechanism 70 may include a motor 71, a motor bracket 72 on which the motor 71 is mounted, a rail 73 fastened to the motor bracket 72, and a slider 74 that slides along the rail 73 according to rotation of the motor 71.

The motor 71 may be provided as a pair of actuating the pair of sliders 74, respectively. The pair of motors 71 may be arranged symmetrically.

The motor 71 may be a linear motor, and the pair of sliders 74 may be actuated in a direction closer to each other or away from each other.

However, the present disclosure is not limited thereto, and the motor 71 may be a rotary motor, and a rotational force of the motor 71 may be converted into a movement directional driving force of the slider 74 by a power transmission mechanism (e.g., a rack and a pinion) connected to the motor.

The motor 71 may be mounted on the motor bracket 72, and the motor bracket 72 may be mounted on the manipulator M.

The rail 73 may be fastened to the motor bracket 72. The rail 73 may be elongated in a movement direction of the slider 74.

The slider 74 may be provided as a pair fastened to the pair of bases 51, respectively. The pair of sliders 74 may move in a direction closer to or away from each other.

The slider 74 may be fastened to the base 51. More specifically, the slider 74 may be fastened to the base 51 by passing through between a pair of fastening panels included in the fastening portion 61 of the main body 60. Therefore, the slider 74, the base 51, the flexible body 52, and the main body 60 may move together.

When the motor 71 is actuated in a direction in which the pair of sliders 74 are close to each other, the pair of grips 62 and the pair of flexible bodies 52 may become closer. Accordingly, the object may be gripped between the pair of grip portions 62 or between the pair of flexible bodies 52.

Conversely, when the motor 71 is actuated in a direction in which the pair of sliders 74 are away from each other, the pair of grip portions 62 and the pair of flexible bodies 52 may become away from each other. Therefore, the object gripped between the pair of grip portions 62 or between the pair of flexible bodies 52 may be released.

Figure 8:
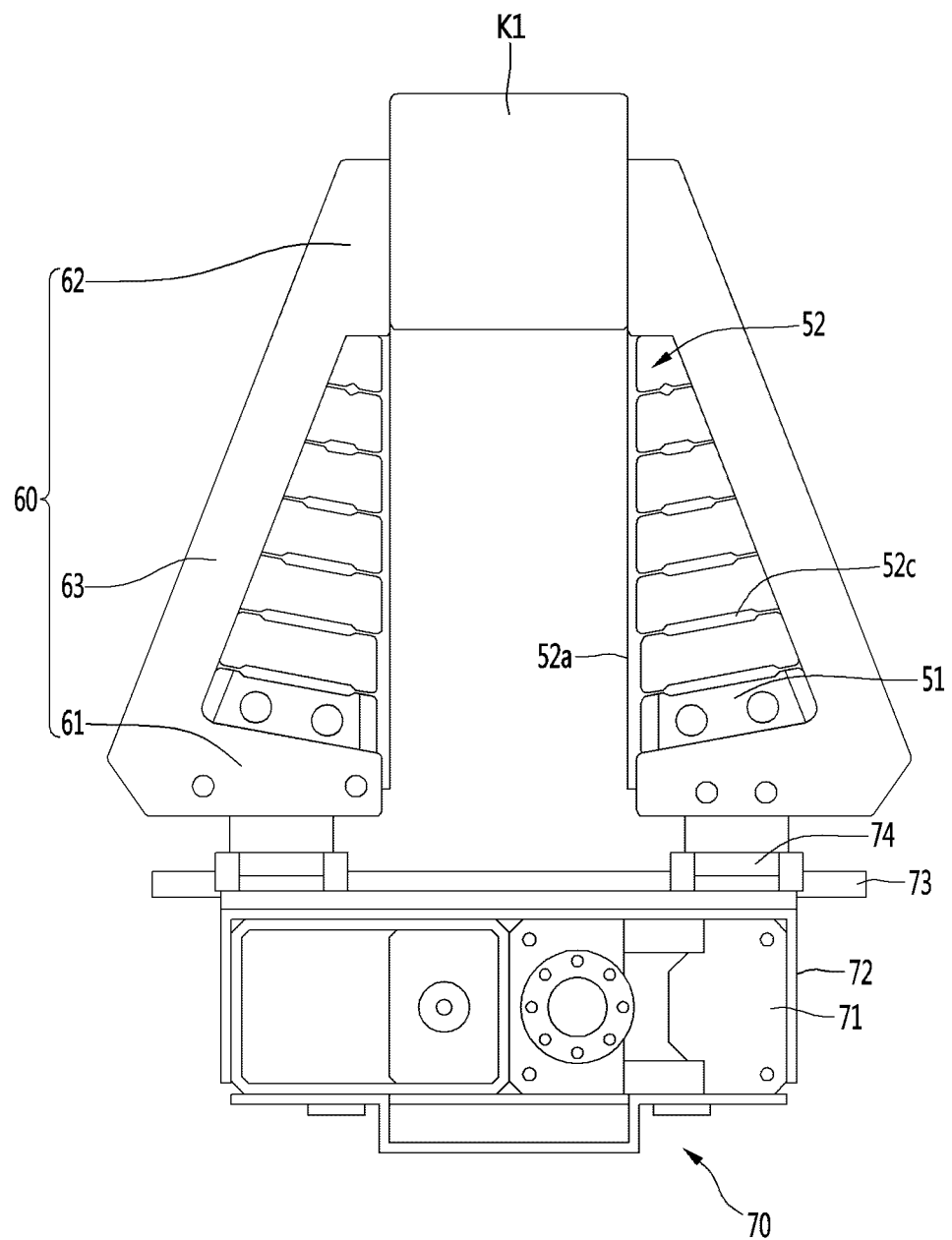
FIGS. 8 and 9 illustrate an operation of the gripper shown in FIG. 6.
Figure 9:
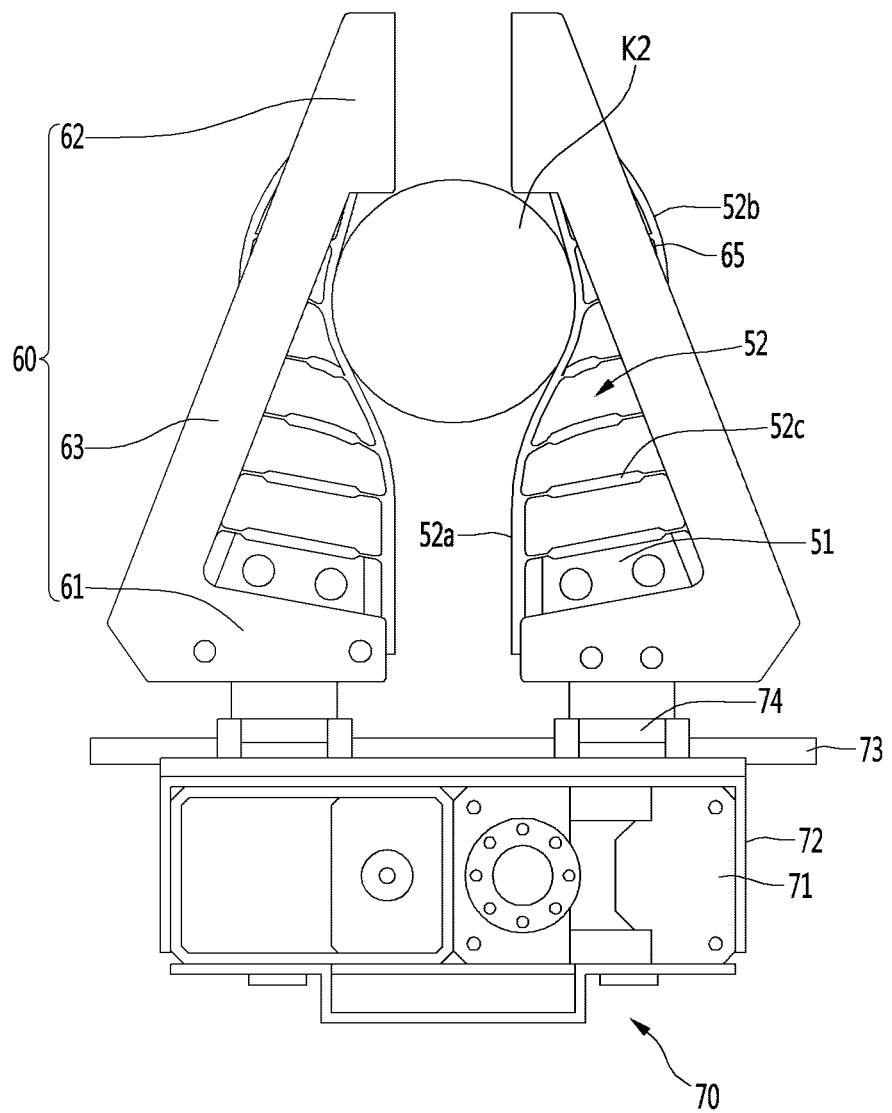

FIGS. 8 and 9 illustrate an operation of the gripper shown in FIG. 6.

Hereinafter, the operation of the gripper 2' according to the present embodiment will be described.

As shown in FIG. 8, the manipulator M may move the gripper 2' so that an object K1 is located between the pair of grip portions 62.

With the pair of grip portions 62 located on both sides of the object K1, the grip mechanism 70 may be controlled to bring the pair of grip portions 62 closer to each other. Accordingly, the object K1 may be gripped between the pair of grip portions 62.

Since the grip portion 62 includes a hard material (e.g., metal), the grip portion 62 may grip the object K1 strongly and precisely. For example, the object K1 may be a tool, and the manipulator M may perform an operation using the tool in a state where the tool is gripped by the gripper 2'.

Meanwhile, as shown in FIG. 9, the manipulator M may move the gripper 2' so that the object K2 is located between the pair of flexible bodies 52.

With the pair of flexible bodies 52 located on both sides of the object K2, the grip mechanism 70 may be controlled to bring the pair of flexible bodies 52 closer to each other. Therefore, the object K2 may be gripped between the pair of flexible bodies 52.

Since the flexible body 52 includes a soft material (e.g., rubber), the flexible body 52 may be elastically deformed to correspond to a shape of the object K2. Therefore, the object K2 may be gripped stably. In addition, the flexible body 52 may alleviate an impact applied to the object, and thus, the object K2 that is easily damaged may be safely gripped. For example, the object K2 may be an egg and the pair of flexible bodies 52 may grip the egg smoothly and stably so that the egg is not broken.

Therefore, the gripper 2' may grip the object effectively by varying the part for gripping the object according to the type of object or the need.

According to an embodiment of the present disclosure, when the moving body is pressed by a reaction force of the bottom surface, the spring may be compressed and the moving body may enter the inside of the body. Therefore, even if the manipulator is not precisely controlled, the moving body is kept adjacent to the bottom surface by the elastic force of the spring, and in this state, an object may be gripped. As a result, the gripper may smoothly grip an object which is thin or has a soft material.

In addition, the spring may mitigate an impact when the gripper touches the bottom surface.

In addition, since the connecting bar connected to the moving body moves together with the moving body in a state of being inserted into the inner body, movement of the moving body may be guided. As a result, an operation reliability of the gripper may be improved.

In addition, the grip pad fastened to the moving body may protrude with respect to an imaginary surface tangent to the ends of the pair of moving bodies. As a result, the grip pad may preferentially contact the bottom surface before the moving body and the grip pad may easily grip a thin object.

In addition, the moving body may be connected to the roller in contact with the bottom surface. As a result, friction between the gripper and the bottom surface may be reduced.

In addition, the grip pad may be adjacent to an imaginary surface tangent to the pair of rollers. As a result, the grip pad may easily grip a thin object when the roller is in contact with the bottom surface.

Meanwhile, according to another embodiment of the present disclosure, since the gripper grips an object between the pair of grip portions, the gripper may grip the object strongly and precisely. Alternatively, since the gripper grips the object between the pair of flexible bodies, the gripper may grip the object stably and smoothly. That is, the gripper may effectively grip the object by varying the part for gripping the object according to the kind of the object or need.

In addition, the flexible body may have a plurality of cavities. As a result, the flexible body may be smoothly deformed even with a relatively small external force and the object may be reliably gripped.

In addition, the object gripped between the pair of flexible bodies may not interfere with the main body due to the opening formed in the main body.

In addition, the main body may have an opening through which the flexible body passes when the flexible body is deformed. As a result, the flexible body may be more easily deformed as compared with a case where the opening is not provided.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A gripper for a manipulator of a robot, the gripper comprising:
   a pair of main bodies each having an internal space and spaced apart from each other;
   a pair of openings provided at ends of the pair of main bodies;
   a pair of moving bodies protruding from the ends of the pair of main bodies through the openings;
   a pair of inner bodies fixed in the internal space of the pair of main bodies;
   a pair of springs configured to be compressed between the inner body and the moving body; and
   a connecting bar fastened to the moving body, configured to move together with the moving body, and having the spring on an outer circumference thereof,
   wherein the inner body has a hollow container shape into which the connecting bar is inserted.

2. The gripper of claim 1, further comprising:
   a grip mechanism configured to vary a distance between the pair of main bodies.

3. A gripper for a manipulator of a robot, the gripper comprising:
   a pair of main bodies each having an internal space and spaced apart from each other;
   a pair of openings provided at ends of the pair of main bodies;
   a pair of moving bodies protruding from the ends of the pair of main bodies through the openings;
   a pair of inner bodies fixed in the internal space of the pair of main bodies;
   a pair of springs configured to be compressed between the inner body and the moving body;
   a pair of sub-openings provided at the pair of main bodies connected to the openings, and facing each other; and
   a pair of grip pads fastened to the moving bodies through the sub-openings and facing each other.

4. The gripper of claim 3, wherein the grip pad includes an elastically deformed material.

5. The gripper of claim 3, wherein the grip pad protrudes with respect to a virtual surface passing through both ends of the pair of moving bodies.

6. The gripper of claim 3, further comprising:
   a pair of rollers located outside the main body and connected to the pair of moving bodies.

7. The gripper of claim 6, wherein the grip pad is adjacent to a virtual surface tangent to the pair of rollers.

8. The gripper of claim 3, wherein the moving body comprises:
   a first surface to which the grip pad is fastened;
   a second surface located on the opposite side of the first surface; and
   a third surface connecting the first surface and the second surface, having at least a portion located outside the main body, and inclined to be closer to the main body from the first surface to the second surface.

9. The gripper of claim 8, further comprising:
   a roller located outside the main body and connected to the moving body,
   wherein a rotary shaft of the roller is more adjacent to the second surface or the third surface than to the first surface.

* * * * *